United States Patent
Hashimoto

(10) Patent No.: US 11,204,454 B2
(45) Date of Patent: Dec. 21, 2021

(54) LAYERED FILM HAVING ANTIREFLECTION FUNCTION AND INFRARED-SHIELDING FUNCTION

(71) Applicant: RIKEN TECHNOS CORPORATION, Tokyo (JP)

(72) Inventor: Taketo Hashimoto, Tokyo (JP)

(73) Assignee: RIKEN TECHNOS CORPORATION

( * ) Notice: Subject to any disclaimer, the term of this patent is extended or adjusted under 35 U.S.C. 154(b) by 222 days.

(21) Appl. No.: 16/473,493

(22) PCT Filed: Nov. 29, 2017

(86) PCT No.: PCT/JP2017/042867
§ 371 (c)(1),
(2) Date: Jun. 25, 2019

(87) PCT Pub. No.: WO2018/123411
PCT Pub. Date: Jul. 5, 2018

(65) Prior Publication Data
US 2019/0383981 A1    Dec. 19, 2019

(30) Foreign Application Priority Data

Dec. 27, 2016  (JP) .............. JP2016-252537

(51) Int. Cl.
*G02B 5/20* (2006.01)
*B32B 27/08* (2006.01)
(Continued)

(52) U.S. Cl.
CPC .............. *G02B 5/208* (2013.01); *B32B 27/08* (2013.01); *B32B 27/308* (2013.01); *B32B 27/34* (2013.01);
(Continued)

(58) Field of Classification Search
None
See application file for complete search history.

(56) References Cited

U.S. PATENT DOCUMENTS 5,976,684 A    11/1999 Oyama et al.
2002/0039651 A1  4/2002 Murata
(Continued)

FOREIGN PATENT DOCUMENTS

CN    101231350 A    7/2008
EP    1494049 A2     1/2005
(Continued)

OTHER PUBLICATIONS

CN201780073041.5 First Office Action dated Feb. 5, 2021, 11 pgs.
(Continued)

*Primary Examiner* — Ramsey Zacharia
(74) *Attorney, Agent, or Firm* — Bracewell LLP; Brad Y. Chin

(57) ABSTRACT

Embodiments relate to a layered film having an antireflection function and an infrared-shielding function. According to at least one embodiment, there is provided a layered film having a heat-ray shielding layer and a low-refractive-index layer in this order on at least one surface of a resin film, where the difference (Rh−Rf) of the refractive index (Rh) of the heat-ray shielding layer and the refractive index (Rf) of the resin film is −0.1 to 0.1, the difference (Rh−RL) of the refractive index (Rh) of the heat-ray shielding layer and the refractive index (RL) of the low-refractive-index layer is 0.05 or greater, and the refractive index (RL) of the low-refractive-index layer is 1.2 to 1.45. The thickness of the heat-ray shielding layer may be 0.1 to 5 μm. The visible-light transmittance of the layered film may be 88% or greater.

11 Claims, 2 Drawing Sheets

(51) Int. Cl.

| | | |
|---|---|---|
| *B32B 27/30* | (2006.01) | |
| *B32B 27/34* | (2006.01) | |
| *B32B 27/36* | (2006.01) | |
| *G02B 1/11* | (2015.01) | |
| *B60J 1/02* | (2006.01) | |
| *B60J 3/00* | (2006.01) | |

(52) U.S. Cl.
CPC ............ *B32B 27/365* (2013.01); *G02B 1/11* (2013.01); *B32B 2255/10* (2013.01); *B32B 2255/26* (2013.01); *B32B 2255/28* (2013.01); *B32B 2307/304* (2013.01); *B32B 2307/418* (2013.01); *B32B 2419/00* (2013.01); *B32B 2605/006* (2013.01); *B32B 2605/08* (2013.01); *B60J 1/02* (2013.01); *B60J 3/007* (2013.01)

(56) References Cited

U.S. PATENT DOCUMENTS

| | | |
|---|---|---|
| 2004/0156110 A1 | 8/2004 | Ikeyama |
| 2007/0154721 A1 | 7/2007 | Wang et al. |
| 2008/0192351 A1 | 8/2008 | Miyagawa et al. |
| 2016/0258694 A1 | 9/2016 | Mitsumoto et al. |

FOREIGN PATENT DOCUMENTS

| | | | |
|---|---|---|---|
| EP | 1494049 A3 | | 2/2005 |
| JP | 2004361525 A | | 12/2004 |
| JP | 2005202389 A | | 7/2005 |
| JP | 2005316428 A | | 11/2005 |
| JP | 2007223332 A | | 9/2007 |
| JP | 2010164713 A | * | 7/2010 |
| JP | 2010164713 A | | 7/2010 |
| JP | 2012121277 A | | 6/2012 |
| JP | 2012137647 A | | 7/2012 |
| JP | 2013041141 A | | 2/2013 |
| JP | 2015104865 A | | 6/2015 |
| JP | 2015118281 A | | 6/2015 |
| WO | 2002075373 A1 | | 9/2002 |
| WO | 2015056594 A1 | | 4/2015 |
| WO | 2016171219 A1 | | 10/2016 |

OTHER PUBLICATIONS

EP17887184.4 Supplementary Search Report dated Jun. 19, 2020, 9 pgs.
PCT/JP2017/042867 International Search Report dated Feb. 27, 2018; 2 pgs.
TW106142628 First Office Action dated Mar. 15, 2021, 8 pgs.
EP17887184.4 First Office Action dated Apr. 20, 2021, 10 pgs.
CN201780073041.5 Second Office Action dated Jun. 21, 2021, 16 pgs.
JP2017-234749 Office Action dated Aug. 10, 2021, 7 pgs.
Daicel-Allnex Ltd, "www.daicel-allnex.com/Products", 2013, 1 page.
Osaka Organic Chemical Industry Ltd., "Chemical Products", Viscoat#540, BisADGA, Bifunctional, Chemical Products, Sep. 4, 2020, 2 pages.
JP2017-234749 Second Office Action dated Oct. 19, 2021, 9 pgs.

* cited by examiner

LAYERED FILM HAVING ANTIREFLECTION FUNCTION AND INFRARED-SHIELDING FUNCTION

CROSS REFERENCE TO RELATED APPLICATIONS

This application claims the benefit of and priority to PCT/JP2017/042867, filed on Nov. 29, 2017, entitled (translation), "LAYERED FILM HAVING ANTIREFLECTION FUNCTION AND INFRARED-SHIELDING FUNCTION," which claims the benefit of and priority to Japanese Patent Application No. 2016-252537, filed on Dec. 27, 2016, which are hereby incorporated by reference in their entirety into this application.

BACKGROUND

Embodiments relate to a laminated film having an antireflection function and an infrared-shielding function.

DESCRIPTION OF THE RELATED ART

Conventionally, a transparent film having an infrared-shielding function has been often pasted on, for example, a building window glass and a car roof window from a viewpoint of making a space comfortable using less energy. In recent years, such transparent infrared-shielding film has been applied to a car front window. On the other hand, the transparent infrared-shielding film applied to a car front window has been required to have very highly transparency by legal restraints from a viewpoint of safety. Therefore, the market has required that the transparent infrared-shielding film further improve a balance between the infrared-shielding function and transparency. Further, when a transparent infrared-shielding film is applied to a car front window, the transparent infrared-shielding film has been required to further have an antireflection function and prevent a decrease in visibility due to the reflection of light thrown from the side or rear of the driver seat also from a viewpoint of safety.

Films having an antireflection function and an infrared-shielding function are suggested in, for example, Patent Literature 1 and Patent Literature 2. In techniques in Patent Literature 1 and Patent Literature 2, however, transparency is insufficient to apply the films to a car front window. Moreover, the techniques in the literatures do not have measures against reflection color irregularities at all.

CITATION LIST

Patent Literature

PATENT LITERATURE 1: JP-A-2015-118281
PATENT LITERATURE 2: JP-A-2015-104865

SUMMARY

An object of the various embodiments is to provide a laminated film in which an antireflection function and an infrared-shielding function are excellent, transparency is high, and reflection color irregularities (which are usually perceived as color difference like an oil film formed on water or gradation like rainbow by visual observation) are suppressed.

As a result of diligent research, the applicant has found that a laminated film having a specific structure could achieve the above object.

According to at least one embodiment, there is provided a laminated film having a heat-ray shielding layer and a low-refractive-index layer in this order on at least one surface of a resin film, where a difference (Rh−Rf) between the refractive index (Rh) of the heat-ray shielding layer and the refractive index (Rf) of the resin film is −0.1 to 0.1; a difference (Rh−RL) between the refractive index (Rh) of the heat-ray shielding layer and the refractive index (RL) of the low-refractive-index layer is 0.05 or greater; and the refractive index (RL) of the low-refractive-index layer is 1.2 to 1.45.

According to at least one embodiment, the thickness of the heat-ray shielding layer is 0.1 to 5 µm.

According to at least one embodiment, a visible-light transmittance is 88% or greater.

According to at least one embodiment, there is provided an article including the laminated film according to the various embodiments discussed above and described in more detail below.

In the laminated film according to an embodiment, an antireflection function and an infrared-shielding function are excellent, transparency is high, and reflection color irregularities are suppressed. Therefore, this laminated film can be suitably used for e.g., a building window glass, a car roof window, and a car front window.

DETAILED DESCRIPTION

Figure 1:
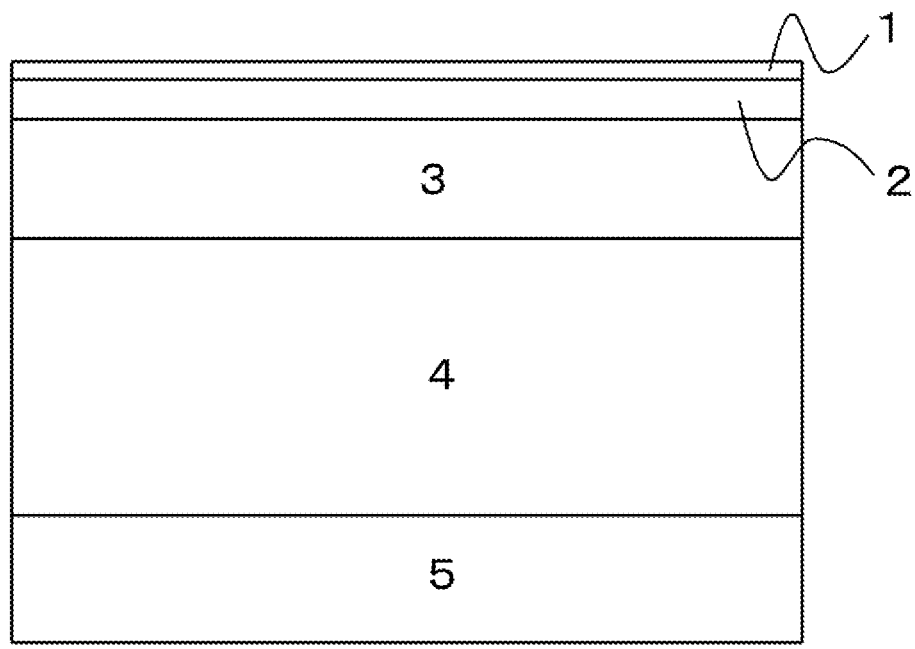
FIG. 1 is a cross-sectional diagram which shows an example of the laminated film according to an embodiment.

The term "film" is herein used as a term also including a sheet. Similarly, the term "sheet" is used as a term also including a film. The term "resin" is used as a term also including a resin mixture containing 2 or more resins, and a resin composition containing a component other than resins. Also, laminating sequentially a layer and another layer, which is referred to herein, includes both directly laminating those layers and laminating those layers with one or more of other layers such as an anchor coat existing between them. The term "or more" for a numerical range is used to mean a certain value or above the certain value. For example, 20% or more means 20% or above 20%. The term "or less" for a numerical range is used to mean a certain value or less than the certain value. For example, 20% or less means 20% or less than 20%. Furthermore, the symbol "-" (or "to") for a numerical range is used to mean a certain value, above the certain value and less than another value, or the other value. Here, the other value is considered as a value more than the certain value. For example, 10 to 90% means 10%, above 10% and less than 90%, or 90%.

It is noted that except for Examples or unless otherwise specified, all values used in the description and claims are modified by the term "about". Each value should be interpreted in view of significant figures and by applying a common rounding method without restricting the application of the doctrine of equivalents to claims.

The laminated film according to an embodiment has a heat-ray shielding layer and a low-refractive-index layer in this order on at least one surface, usually on one surface, of a resin film.

In a typical aspect, a resin film, a heat-ray shielding layer, and a low-refractive-index layer are directly laminated. In another aspect, the laminated film according to an embodiment may comprise an optional layer(s) other than the resin film, the heat-ray shielding layer and the low-refractive-index layer between or on any of these layers, as long as the desired effects that the antireflection and infrared-shielding functions are excellent, the transparency is high, and the reflection color irregularities are suppressed are exhibited.

Resin Film

The resin film is a film substrate to form a heat-ray shielding layer and a low-refractive-index layer thereon. As the resin film, any type of resin film can be used. As the resin film, those which have high transparency and are not colored can be preferably used. Examples of the resin film can include films of, for example, cellulose ester-based resins such as triacetyl cellulose; polyester-based resins such as polyethylene terephthalate; cyclic hydrocarbon-based resins such as an ethylene norbornene copolymer; acrylic resins such as polymethyl methacrylate, polyethyl methacrylate, and a vinylcyclohexane-methyl (meth)acrylate copolymer; aromatic polycarbonate-based resins; polyolefin-based resins such as polypropylene and 4-methyl-pentene-1; polyamide-based resins; polyarylate-based resins; polymer-type urethane acrylate-based resins; and polyimide-based resins. These films include unstretched films, uniaxially stretched films, and biaxially stretched films. Also, included is a multilayer resin film in which one or two or more of these films are laminated in two or more layers.

The thickness of the resin film is not particularly restricted, and any thickness can be used as desired. The thickness of the resin film may be usually 20 μm or more and preferably 50 μm or more from a viewpoint of the handling properties of the laminated film according to an embodiment. When the laminated film according to an embodiment is used for applications which require high stiffness, the thickness of the resin film may be usually 300 μm or more, preferably 500 μm or more, and more preferably 600 μm or more from a viewpoint of keeping stiffness. Further, the thickness of the resin film may be usually 1500 μm or less, preferably 1200 μm or less, and more preferably 1000 μm or less from a viewpoint of meeting the need of making an article thinner. When the laminated film according to an embodiment is used for applications which do not require high stiffness, the thickness of the resin film may be usually 250 μm or less, and preferably 150 μm or less from a viewpoint of economic efficiency.

In addition, the thickness of the resin film is substantially constant over the entire film. The "substantially constant thickness" herein means that it is within a range of about −5 to +5 μm, which is a deflection width of process/quality control which is commonly carried out industrially (the same also applies to each layer when the film has a multilayer structure as described below). For example, when setting the thickness of the resin film to be manufactured to 100 μm, in a case of causing a fluctuation of −5 to +5 μm at maximum such that the thickness of a certain portion of the film is 95 μm and the thickness of another portion of the film is 105 μm, it can be said that the film has a substantially constant thickness of 100 μm.

The total light transmittance of the resin film (measured in accordance with JIS K 7361-1:1997 using a turbidimeter "NDH2000" (trade name) of Nippon Denshoku Industries Co., Ltd.) may be preferably 85% or more, more preferably 90% or more, and further preferably 92% or more. In the resin film, a higher total light transmittance is more preferred.

The yellowness index of the resin film (measured in accordance with JIS K 7105:1981 using a colorimeter "SolidSpec-3700" (trade name) manufactured by Shimadzu Corporation) may be preferably 3 or less, more preferably 2 or less, and further preferably 1 or less. In the resin film, a lower yellowness index is more preferred.

The refractive index (Rf) of the resin film may be preferably 1.40 or more, more preferably 1.45 or more, further preferably 1.49 or more, and further more preferably 1.50 or more from a viewpoint of the antireflection function of the laminated film. On the other hand, the refractive index (Rf) of the resin film may be preferably 1.65 or less and more preferably 1.60 or less from a viewpoint of suppressing reflection irregularities of the laminated film. In one embodiment the refractive index (Rf) of the resin film may be preferably 1.40 or more and 1.65 or less, 1.40 or more and 1.60 or less, 1.45 or more and 1.65 or less, 1.45 or more and 1.60 or less, 1.49 or more and 1.65 or less, 1.49 or more and 1.60 or less, 1.50 or more and 1.65 or less, or 1.50 or more and 1.60 or less.

The refractive index (Rf) is a value determined in accordance with the A method of JIS K 7142:2008 using an Abbe refractometer under the conditions that sodium D line (wavelength 589.3 nm) is applied; 1-bromonaphthalene is used as a contact liquid; the surface of the resin film on which the heat-ray shielding layer is formed serves as a surface brought into contact with prism; and the machine direction of the resin film accords with the length direction of a test piece. Here, even when the resin film is a multilayer film, without considering that, the refractive index (Rf) is determined by the above-described method. Further, even when the resin film has e.g. an anchor coat layer on the surface on which the heat-ray shielding layer is formed, without considering that, the refractive index (Rf) is determined by the above-described method (by regarding a whole of the laminate, in which an anchor coat layer or the like is formed on the resin film, as a resin film). That is, the refractive index (Rf) is a value determined under the conditions that the surface on which the heat-ray shielding layer is directly laminated serves as a surface brought into contact with prism.

Preferred examples of the resin film can include resin films formed from acrylic resins.

Examples of the acrylic resin can include a (meth)acrylic acid ester (co)polymer, a copolymer comprised mainly of a constitutional unit derived from a (meth)acrylic acid ester (usually 50 mol % or more, preferably 65 mol % or more, more preferably 70 mol % or more) and modified products thereof. It is noted that (meth)acryl means acryl or methacryl, and a (co)polymer means a polymer or a copolymer.

Examples of the (meth)acrylic acid ester (co)polymer can include polymethyl (meth)acrylate, polyethyl (meth)acrylate, polypropyl (meth)acrylate, polybutyl (meth)acrylate, a methyl (meth)acrylate-butyl (meth)acrylate copolymer, an ethyl (meth)acrylate-butyl (meth)acrylate copolymer, and the like.

Examples of the copolymer comprised mainly of a constitutional unit derived from a (meth)acrylic acid ester can include an ethylene-methyl (meth)acrylate copolymer, a styrene-methyl (meth)acrylate copolymer, a vinylcyclohexane-methyl (meth)acrylate copolymer, a maleic anhydride-methyl (meth)acrylate copolymer, and an N-substituted maleimide-methyl (meth)acrylate copolymer, and the like.

Examples of the modified products can include a polymer into which a lactone ring structure is introduced by an intramolecular cyclization reaction; a polymer into which glutaric anhydride is introduced by an intramolecular cyclization reaction; and a polymer into which an imide structure is introduced by a reaction with an imidizing agent (examples thereof can include methylamine, cyclohexylamine, and ammonia and the like) (hereinafter, referred to as poly(meth)acrylimide-based resin), and the like.

Examples of the resin film of an acrylic-based resin can include a film of one or a mixture of two or more of these. Also, included is a laminated film in which one or two or more of these films are laminated in two or more layers.

The resin film is more preferably a film of a vinylcyclohexane-methyl (meth)acrylate copolymer. A laminated film having excellent transparency, surface smoothness, appearance, stiffness and moisture resistance can be obtained by using such resin film. The amount of constitutional units derived from methyl (meth)acrylate contained in the vinylcyclohexane-methyl (meth)acrylate copolymer may be usually 50 to 95 mol %, preferably 65 to 90 mol %, and more preferably 70 to 85 mol % when the sum of constitutional units derived from all polymerizable monomers is assumed to be 100 mol %. Here, the term "polymerizable monomer" means methyl (meth)acrylate, vinylcyclohexane, and a monomer copolymerizable with these. The copolymerizable monomer is usually a compound having a carbon-carbon double bond, typically a compound having an ethylenically double bond.

The resin film is more preferably a film of a poly(meth)acrylimide-based resin. A laminated film having excellent transparency, surface smoothness, appearance, stiffness, heat resistance and dimensional stability under heat can be obtained by using such a resin film.

The yellowness index of the acrylic-based resin (measured in accordance with JIS K 7105:1981 using a colorimeter "SolidSpec-3700" (trade name) of SHIMADZU CORPORATION) may be preferably 3 or less, more preferably 2 or less, and further preferably 1 or less. In the acrylic-based resin, a lower yellowness index is more preferred.

The melt mass flow rate of the acrylic-based resin (measured in accordance with ISO1133 at 260° C. and 98.07 N) may be preferably 0.1 to 20 g/10 min, and more preferably 0.5 to 10 g/10 min from a viewpoint of extrusion load and the stability of a molten film.

In addition, the acrylic-based resin can further contain, as desired, a thermoplastic resin other than acrylic-based resins; a pigment, an inorganic filler, an organic filler, a resin filler; additives such as a lubricant, an antioxidant, a weather-resistant stabilizer, a heat stabilizer, a release agent, an antistatic agent, and a surfactant, and the like, as long as the object of an embodiment cannot be impaired. The amount of the optional component(s) is usually about 0.01 to 10 parts by mass when the amount of acrylic-based resin is assumed to be 100 parts by mass.

The resin film is more preferably a multilayer resin film in which a first acrylic-based resin layer ($\alpha$1); an aromatic polycarbonate-based resin layer ($\beta$); and a second acrylic-based resin layer ($\alpha$2) are directly laminated in this order. It is noted that an embodiment will be herein described assuming that the heat-ray shielding layer is formed on the side of the ($\alpha$1) layer.

Although the acrylic-based resins have many excellent properties, cutting workability easily becomes insufficient. Thus, a laminated film having also excellent cutting workability can be easily obtained by using a multilayer resin film having the layer structure.

The layer thickness of the ($\alpha$1) layer is not particularly restricted and may be usually 20 μm or more, preferably 40 μm or more, more preferably 60 μm or more, and further preferably 80 μm or more from a viewpoint of making good use of excellent properties of an acrylic-based resin.

The layer thickness of the ($\alpha$2) layer is not particularly restricted and is preferably the same layer thickness as the ($\alpha$1) layer from a viewpoint of anti-curling properties of the laminated film according to an embodiment.

"The same layer thickness" herein should not be interpreted as the same layer thickness in a physiochemically strict sense, and should be interpreted as the same layer thickness within variation in process and quality control generally performed in industry. This is because, in the case of the same layer thickness within variation in process and quality control generally performed in industry, the anti-curling properties of a multilayer film can be kept good. Because, in the case of a unstretched multilayer film by a T-die co-extrusion method, process and quality control usually within a range of about −5 to +5 μm, for example when a set layer thickness is 70 μm, layer thicknesses 65 μm and 75 μm should be interpreted as the same thickness. "The same layer thickness" herein can be restated as "the substantially same layer thickness".

The layer thickness of the ($\beta$) layer is not particularly restricted, and may be usually 20 μm or more, and preferably 80 μm or more from a viewpoint of the cutting workability of the laminated film according to an embodiment.

As the acrylic-based resins used for the ($\alpha$1) layer and the ($\alpha$2) layer, the above-described resins can be used.

It is noted that as an acrylic-based resin used for the ($\alpha$1) layer and an acrylic-based resin used for the ($\alpha$2) layer, acrylic-based resins having different resin properties, for example, those with different types, melt mass flow rates, and glass transition temperatures may be used. Acrylic-based resins having the same resin properties are preferably used from a viewpoint of the anti-curling properties of the laminated film according to an embodiment. For example, in one preferred embodiment, acrylic-based resins having the same grade and the same lot are used.

Examples of the aromatic polycarbonate-based resin usable for the ($\beta$) layer include one or a mixture of two or more of aromatic polycarbonate-based resins such as a polymer obtained from an aromatic dihydroxy compound such as bisphenol A, dimethyl bisphenol A, or 1,1-bis(4-hydroxyphenyl)-3,3,5-trimethyl cyclohexane and phosgene by an interfacial polymerization method; and a polymer obtained from an aromatic dihydroxy compound such as bisphenol A, dimethyl bisphenol A, or 1,1-bis(4-hydroxyphenyl)-3,3,5-trimethyl cyclohexane and a diester carbonate such as diphenyl carbonate by a transesterification reaction.

Preferred examples of optional components which can be contained in the aromatic polycarbonate-based resin include a core shell rubber. Cutting workability and impact resistance can be further increased by using a core shell rubber in an amount of 0 to 30 parts by mass (100 to 70 parts by mass of an aromatic polycarbonate-based resin) and preferably 0 to 10 parts by mass (100 to 90 parts by mass of an aromatic polycarbonate-based resin) when the sum of the aromatic polycarbonate-based resin and the core shell rubber is assumed to be 100 parts by mass.

Examples of the core shell rubber can include core shell rubbers such as a methacrylic acid ester-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylic acid ester graft copolymer, a methacrylic acid ester/acrylic acid ester rubber graft copolymer, and a methacrylic acid ester-acrylonitrile/acrylic acid ester rubber graft copolymer. As the core shell rubber, one or a mixture of two or more of these can be used.

Further, the aromatic polycarbonate-based resin can further contain, as desired, a thermoplastic resin other than aromatic polycarbonate-based resins and core shell rubbers; a pigment, an inorganic filler, an organic filler, a resin filler; additives such as a lubricant, an antioxidant, a weather-resistant stabilizer, a heat stabilizer, a release agent, an antistatic agent, and a surfactant, and the like, as long as the object of an embodiment cannot be impaired. The amount of the optional component(s) is usually about 0.01 to 10 parts by mass when the sum of the aromatic polycarbonate-based resin and the core shell rubber is assumed to be 100 parts by mass.

The method for producing the resin film is not particularly restricted. As an example of a preferred production method, in a case where the resin film is a multilayer film in which a first poly(meth)acrylimide-based resin layer ($\alpha 1$); an aromatic polycarbonate-based resin layer ($\beta$); and a second poly(meth)acrylimide-based resin layer ($\alpha 2$) are directly laminated in this order, a method described in JP-A-2015-083370 can be exemplified. Also, when forming the heat-ray shielding layer, the surface on which the heat-ray shielding layer is formed or both sides of the resin film may be subjected to an easy adhesion treatment such as a corona discharge treatment or anchor coat formation in advance to improve adhesion strength to the heat-ray shielding layer.

Heat-Ray Shielding Layer

The heat-ray shielding layer is a layer formed from a coating material containing a heat-ray shielding material, and has a heat-ray shielding function.

The refractive index (Rh) of the heat-ray shielding layer may be preferably 1.40 or more, more preferably 1.45 or more, further preferably 1.49 or more, and further more preferably 1.50 or more from a viewpoint of the antireflection function of the laminated film. On the other hand, the refractive index (Rh) of the heat-ray shielding layer may be preferably 1.65 or less, and more preferably 1.60 or less from a viewpoint of suppressing reflection irregularities of the laminated film. In one embodiment, the refractive index (Rh) of the heat-ray shielding layer may be preferably 1.40 or more and 1.65 or less, 1.40 or more and 1.60 or less, 1.45 or more and 1.65 or less, 1.45 or more and 1.60 or less, 1.49 or more and 1.65 or less, 1.49 or more and 1.60 or less, 1.50 or more and 1.65 or less, or 1.50 or more and 1.60 or less.

The refractive index (Rh) is a value determined in accordance with the A method of JIS K 7142:2008 using an Abbe refractometer under the conditions that sodium D line (wavelength 589.3 nm) is applied; 1-bromonaphthalene is used as a contact liquid; when making a sample, the surface on the side of a biaxially stretched polypropylene-based resin film serves as a surface brought into contact with prism; and the direction of operating a bar coater of the sample accords with the length direction of a test piece. The coating material containing a heat-ray shielding material for forming the heat-ray shielding layer is applied onto a corona-treated surface of a biaxially stretched polypropylene-based resin film "PYLEN Film-OT P2102" (trade name) of Toyobo Co., Ltd. with a thickness of 20 µm using a bar coater so that the thickness after curing becomes 5 µm, and the coat obtained by drying and curing is then released from the biaxially stretched polypropylene-based resin film and used as the sample.

In addition, the refractive index (Rh) can be also measured using another biaxially stretched polypropylene-based resin film having substantially the same physical properties as the commercial product.

The difference (Rh−Rf) between the refractive index (Rh) of the heat-ray shielding layer and the refractive index (Rf) of the resin film is usually −0.1 to 0.1, preferably −0.01 to 0.07, more preferably 0.0 to 0.04, and further preferably 0.01 to 0.04 from a viewpoint of suppressing reflection irregularities of the laminated film.

The thickness of the heat-ray shielding layer may be usually 5 µm or less, preferably 3 µm or less, and more preferably 2 µm or less from a viewpoint of suppressing reflection irregularities of the laminated film. On the other hand, the thickness of the heat-ray shielding layer may be usually 0.1 µm or more, and preferably 0.5 µm or more from a viewpoint of the heat-ray shielding function. In one embodiment, the thickness of the heat-ray shielding layer may be usually 0.1 µm or more and 5 µm or less, preferably 0.1 µm or more and 3 µm or less, 0.1 µm or more and 2 µm or less, 0.5 µm or more and 5 µm or less, 0.5 µm or more and 3 µm or less, or 0.5 µm or more and 2 µm or less.

It is surprising that reflection color irregularities of the laminated film do not depend on the properties of the low-refractive-index layer, and are remarkably suppressed when a relationship between the properties of the resin film and the properties of the heat-ray shielding layer, that is, the difference in refractive index (Rh−Rf) is within the above-described range, preferably when the difference in refractive index (Rh−Rf) is within the above-described range and the thickness of the heat-ray shielding layer is within the above-described range. There is no intention to be bound by theory; however, it can be considered that based on the theory that while the heat-ray shielding function is related to the amount of heat-ray shielding material (typically fine particles described below) in a whole layer, reflection color irregularities of the laminated film are related to the average concentration of heat-ray shielding material, adding a heat-ray shielding material at a certain low concentration to a certain thick layer may be effective.

The coating material containing a heat-ray shielding material used to form the heat-ray shielding layer is not restricted except that it contains a heat-ray shielding material, and any type of coating material can be used. As the coating material containing a heat-ray shielding material used to form the heat-ray shielding layer, preferable examples include a coating material containing (A) a polyfunctional (meth)acrylate; and (B) a heat-ray shielding material, more preferably a coating material containing 100 parts by mass of (A) a polyfunctional (meth)acrylate; and 10 to 400 parts by mass of (B) a heat-ray shielding material.

(A) Polyfunctional (Meth)Acrylate

The polyfunctional (meth)acrylate of component (A) is a (meth)acrylate having 2 or more (meth)acryloyl groups in a molecule. This polyfunctional (meth)acrylate has 2 or more (meth)acryloyl groups in a molecule, and thus is polymerized and cured by an active energy ray such as ultraviolet rays or an electron beam so as to form a coat.

Examples of the polyfunctional (meth)acrylate can include (meth)acryloyl group-containing difunctional reactive monomers such as diethylene glycol di(meth)acrylate, neopentyl glycol di(meth)acrylate, 1,6-hexanediol di(meth)acrylate, polyethylene glycol di(meth)acrylate, 2,2'-bis(4-

(meth)acryloyloxy polyethyleneoxy phenyl)propane, and 2,2'-bis(4-(meth)acryloyloxy polypropyleneoxy phenyl)propane; (meth)acryloyl group-containing trifunctional reactive monomers such as trimethylolpropane tri(meth)acrylate, trimethylolethane tri(meth)acrylate, and pentaerythritol tri(meth)acrylate; (meth)acryloyl group-containing tetrafunctional reactive monomers such as pentaerythritol tetra(meth)acrylate; (meth)acryloyl group-containing hexafunctional reactive monomers such as dipentaerythritol hexaacrylate; and polymers (oligomers and prepolymers) having one or more of these as a constitutional monomer. Other examples of the polyfunctional (meth)acrylate can include prepolymers or oligomers of e.g. polyurethane (meth)acrylate, polyester (meth)acrylate, polyacryl (meth)acrylate, polyepoxy (meth)acrylate, polyalkylene glycol poly(meth)acrylate, and polyether (meth)acrylate, wherein the prepolymers or oligomers have 2 or more (meth)acryloyl groups. As the polyfunctional (meth)acrylate of component (A), one or a mixture of two or more of these can be used. It is noted that the term (meth)acrylate herein means acrylate or methacrylate.

(B) Heat-Ray Shielding Material

The heat-ray shielding material of component (B) functions to shield heat rays by efficiently absorbing or reflecting near infrared rays of solar light and also to penetrate visible light. This heat-ray shielding material is not particularly limited as long as it has such a function.

Examples of the heat-ray shielding material can include fine particles of substances such as tin-doped indium oxide, antimony-doped tin oxide, cesium-doped tungsten oxide, aluminum-doped zinc oxide, gallium-doped zinc oxide, and niobium-doped titanium oxide. Here, tin-doped indium oxide is a substance in which part of $In^{3+}$ in indium oxide is substituted with $Sr^{4+}$, and is generally also called ITO. Among these, fine particles of tin-doped indium oxide are preferred from a viewpoint of transparency. As the heat-ray shielding material of component (B), one or a mixture of two or more of these can be used.

The average particle diameter of the heat-ray shielding material of component (B) may be usually 300 nm or less, preferably 200 nm or less, and more preferably 100 nm or less from a viewpoint of transparency. On the other hand, the average particle diameter can be usually 1 nm or more, and preferably 5 nm or more from a viewpoint of the coating properties of a coating material. In one embodiment, the average particle diameter of the heat-ray shielding material of component (B) may be usually 1 nm or more and 300 nm or less, preferably 1 nm or more and 200 nm or less, 1 nm or more and 100 nm or less, 5 nm or more and 300 nm or less, 5 nm or more and 200 nm or less, or 5 nm or more and 100 nm or less.

The average particle diameter of fine particles referred to herein is a particle size at which a cumulative value from the smallest particle size reaches 50% by mass in a particle size distribution curve measured using a laser diffraction/scattering method. That is, the average particle diameter of fine particles can be calculated as a particle size at which a cumulative value from the smallest particle size reaches 50% by mass in a particle size distribution curve measured using a laser diffraction/scattering particle size analyzer "MT 3200 II" (trade name) available from Nikkiso Co., Ltd.

The amount of the heat-ray shielding material of component (B) may be usually 10 parts by mass or more, preferably 30 parts by mass or more, more preferably 50 parts by mass or more, further preferably 100 parts by mass or more, and most preferably 150 parts by mass or more with respect to 100 parts by mass of component (A) from a viewpoint of heat-ray shielding function. On the other hand, the amount of the heat-ray shielding material of component (B) may be usually 400 parts by mass or less, preferably 350 parts by mass or less, and more preferably 300 parts by mass or less from viewpoints of transparency and the coating properties of a coating material. In one embodiment, the amount of the heat-ray shielding material of component (B) may be usually 10 parts by mass or more and 400 parts by mass or less, preferably 10 parts by mass or more and 350 parts by mass or less, 10 parts by mass or more and 300 parts by mass or less, 30 parts by mass or more and 400 parts by mass or less, 30 parts by mass or more and 350 parts by mass or less, 30 parts by mass or more and 300 parts by mass or less, 50 parts by mass or more and 400 parts by mass or less, preferably 50 parts by mass or more and 350 parts by mass or less, 50 parts by mass or more and 300 parts by mass or less, 100 parts by mass or more and 400 parts by mass or less, 100 parts by mass or more and 350 parts by mass or less, 100 parts by mass or more and 300 parts by mass or less, 150 parts by mass or more and 400 parts by mass or less, 150 parts by mass or more and 350 parts by mass or less, or 150 parts by mass or more and 300 parts by mass or less.

It is preferred that the coating material containing a heat-ray shielding material further contain a compound having 2 or more isocyanate groups (—N=C=O) in a molecule and/or a photopolymerization initiator from a viewpoint of making curing properties by an active energy ray good.

Examples of the compound having 2 or more isocyanate groups in a molecule can include methylenebis-4-cyclohexylisocyanate; polyisocyanates such as a trimethylolpropane adduct of tolylene diisocyanate, a trimethylolpropane adduct of hexamethylene diisocyanate, a trimethylolpropane adduct of isophorone diisocyanate, an isocyanurate of tolylene diisocyanate, an isocyanurate of hexamethylene diisocyanate, an isocyanurate of isophorone diisocyanate, and a biuret of hexamethylene diisocyanate; and urethane cross-linking agents such as blocked isocyanates of the polyisocyanates, and the like. As the compound having 2 or more isocyanate groups in a molecule, one or a mixture of two or more of these can be used. Further, a catalyst such as dibutyltin dilaurate or dibutyltin diethylhexanoate may be added as needed at the time of cross-linking.

Examples of the photopolymerization initiator can include benzophenone compounds such as benzophenone, methyl-o-benzoyl benzoate, 4-methylbenzophenone, 4,4'-bis(diethylamino)benzophenone, methyl o-benzoylbenzoate, 4-phenylbenzophenone, 4-benzoyl-4'-methyldiphenylsulfide, 3,3',4,4'-tetra(tert-butylperoxycarbonyl) benzophenone, and 2,4,6-trimethylbenzophenone; benzoin compounds such as benzoin, benzoin methyl ether, benzoin ethyl ether, benzoin isopropyl ether, and benzyl methyl ketal; acetophenone compounds such as acetophenone, 2,2-dimethoxy-2-phenylacetophenone, and 1-hydroxycyclohexyl phenyl ketone; anthraquinone compounds such as methyl anthraquinone, 2-ethyl anthraquinone, and 2-amyl anthraquinone; thioxanthone compounds such as thioxanthone, 2,4-diethyl thioxanthone, and 2,4-diisopropyl thioxanthone; alkylphenone compounds such as acetophenone dimethyl ketal; triazine compounds; biimidazole compounds; acylphosphine oxide compounds; titanocene compounds; oxime ester compounds; oxime phenyl acetate compounds; hydroxy ketone compounds; and aminobenzoate compounds, and the like. As the photopolymerization initiator, one or a mixture of 2 or more of these can be used.

The amount of the photopolymerization initiator may be usually 10 parts by mass or less, preferably 7 parts by mass or less, and more preferably 5 parts by mass or less with respect to 100 parts by mass of component (A) from a viewpoint that a coat formed is hard to turn yellow colored and from a viewpoint of curing rate. On the other hand, the lower limit of the amount of the photopolymerization initiator is not particularly limited because of an optional component and may be usually 0.1 part by mass or more, preferably 0.5 parts by mass or more, and more preferably 1 part by mass or more from a viewpoint of certainly obtaining the effect of use. In one embodiment, the amount of the photopolymerization initiator may be usually 0.1 part by mass or more and 10 parts by mass or less, preferably 0.1 part by mass or more and 7 parts by mass or less, 0.1 part by mass or more and 5 parts by mass or less, 0.5 parts by mass or more and 10 parts by mass or less, 0.5 parts by mass or more and 7 parts by mass or less, 0.5 parts by mass or more and 5 parts by mass or less, 1 part by mass or more and 10 parts by mass or less, 1 part by mass or more and 7 parts by mass or less, or 1 part by mass or more and 5 parts by mass or less.

It is preferred that the coating material containing a heat-ray shielding material further contain a leveling agent from viewpoints that the surface of the heat-ray shielding layer can be made smooth and the low-refractive-index layer can be easily formed.

Examples of the leveling agent can include an acrylic-based leveling agent, a silicone-based leveling agent, a fluorine-based leveling agent, a silicone-acrylic copolymer-based leveling agent, a fluorine-modified acrylic-based leveling agent, a fluorine-modified silicone-based leveling agent, and leveling agents in which a functional group (e.g. an alkoxy group such as a methoxy group or an ethoxy group, an acyloxy group, a halogen group, an amino group, a vinyl group, an epoxy group, a methacryloxy group, an acryloxy group, an isocyanate group, etc.) is introduced into these compounds, and the like. Among them, a silicone-acrylic copolymer-based leveling agent is preferred. As the leveling agent, one or a mixture of two or more of these can be used.

The amount of the leveling agent may be usually 0.01 part by mass or more, preferably 0.1 part by mass or more, and more preferably 0.2 parts by mass or more with respect to 100 parts by mass of component (A) from viewpoints that the surface of the heat-ray shielding layer can be made smooth and the low-refractive-index layer can be easily formed. On the other hand, the amount of the leveling agent may be usually 1 part by mass or less, preferably 0.6 parts by mass or less, and more preferably 0.4 parts by mass or less from a viewpoint that a coating material for forming the low-refractive-index layer can be applied well onto a surface of the heat-ray shielding layer without being repelled. It is noted that the amount herein is a value in terms of solid content. In one embodiment, the amount of the leveling agent may be usually 0.01 part by mass or more and 1 part by mass or less, preferably 0.01 part by mass or more and 0.6 parts by mass or less, 0.01 part by mass or more and 0.4 parts by mass or less, 0.1 part by mass or more and 1 part by mass or less, 0.1 part by mass or more and 0.6 parts by mass or less, 0.1 part by mass or more and 0.4 parts by mass or less, 0.2 parts by mass or more and 1 part by mass or less, 0.2 parts by mass or more and 0.6 parts by mass or less, or 0.2 parts by mass or more and 0.4 parts by mass or less.

The coating material containing a heat-ray shielding material can contain, as desired, one or two or more additives such as an antioxidant, a weather-resistant stabilizer, a light resistant stabilizer, an ultraviolet ray absorber, a heat stabilizer, an antistatic agent, a surfactant, a thixotropy-imparting agent, a fouling inhibitor, a printability improver, inorganic fine particles, organic fine particles, an inorganic coloring agent, and an organic coloring agent.

The coating material containing a heat-ray shielding material can contain a solvent for dilution to a concentration at which coating can be easily carried out as desired. The solvent is not particularly restricted as long as it neither reacts with any of components (A), (B) and other optional components nor catalyze (promote) self-reaction (including deteriorative reaction) of these components. Examples of the solvent can include 1-methoxy-2-propanol, ethyl acetate, n-butyl acetate, toluene, methyl ethyl ketone, methyl isobutyl ketone, diacetone alcohol, and acetone, and the like. As the solvent, one or a mixture of two or more of these can be used.

The coating material containing a heat-ray shielding material can be obtained by mixing and stirring these components.

The method for forming the heat-ray shielding layer using the coating material containing a heat-ray shielding material is not particularly restricted, and a known web coating method can be used. Specific examples thereof can include methods such as roll coating, gravure coating, reverse coating, roll brushing, spray coating, air knife coating, and die coating.

Low-Refractive-Index Layer

The low-refractive-index layer is formed from a coating material which can form a coat with a low refractive index, and functions to express an antireflection function of the laminated film.

The refractive index (RL) of the low-refractive-index layer is usually 1.45 or less, and preferably 1.4 or less from a viewpoint of expressing a good antireflection function of the laminated film. On the other hand, the refractive index (RL) of the low-refractive-index layer may be preferably 1.2 or more, and more preferably 1.3 or more from viewpoints of surface appearance and transparency. In one embodiment, the refractive index (RL) of the low-refractive-index layer may be usually 1.2 or more and 1.45 or less, preferably 1.2 or more and 1.4 or less, 1.3 or more and 1.45 or less, or 1.3 or more and 1.4 or less.

The refractive index (RL) is a value determined in accordance with the A method of JIS K 7142:2008 using an Abbe refractometer under the conditions that sodium D line (wavelength 589.3 nm) is applied; 1-bromonaphthalene is used as a contact liquid; when making a sample, the surface on the side of a biaxially stretched polypropylene-based resin film serves as a surface brought into contact with prism; and the direction of operating a bar coater of the sample accords with the length direction of a test piece. The coating material for forming the low-refractive-index layer is applied onto a corona-treated surface of a biaxially stretched polypropylene-based resin film "PYLEN Film-OT P2102" (trade name) of Toyobo Co., Ltd. with a thickness of 20 μm using a bar coater so that the thickness after curing becomes 2 μm, and the coat obtained by drying and curing is then released from the biaxially stretched polypropylene-based resin film and used as the sample.

In addition, the refractive index (RL) can be also measured using another biaxially stretched polypropylene-based resin film having substantially the same physical properties as the commercial product.

The coating material for forming the low-refractive-index layer is not limited as long as the refractive index (RL) is within the above-described range, and any coating material can be used. As such a coating material, it is possible to use, for example, a coating material containing a matrix component which can form a coat, and fine particles of a low-refractive-index material such as polysiloxane, hollow silica, magnesium fluoride, and a fluorine resin.

Among fine particles of these low-refractive-index materials, hollow silica is preferred. Hollow silica with an average particle diameter of usually about 5 to 150 nm, preferably 10 to 80 nm is more preferred.

As with the heat-ray shielding material, the average particle diameter of fine particles of a low-refractive-index material is a particle size at which a cumulative value from the smallest particle size reaches 50% by mass in a particle size distribution curve measured using a laser diffraction/scattering method. That is, the average particle diameter of fine particles can be calculated as a particle size at which a cumulative value from the smallest particle size reaches 50% by mass in a particle size distribution curve measured using a laser diffraction/scattering particle size analyzer "MT 3200 II" (trade name) available from Nikkiso Co., Ltd.

The matrix component in a low-refractive-index material is not particularly limited as long as the expression of the low refractive index is not inhibited. As the matrix component, a resin material, for example a thermosetting resin, an active energy ray curable resin which is cured by e.g. light rays such as ultraviolet rays and an electron beam, or the like can be usually used. In one typical embodiment, the matrix component may be a thermosetting resin. Examples of the thermosetting resin include a phenol resin, a urea resin, a melamine resin, unsaturated polyester, an epoxy resin, a silicone resin, a two-part curable urethane resin, polyurethane, and the like. In another typical embodiment, the matrix component may be an active energy ray curable resin. Examples of the active energy ray curable resin can include acrylic-based resins such as polyfunctional (meth)acrylate. As the polyfunctional (meth)acrylate, one or a mixture of two or more of compounds described above as component (A) in the description of the heat-ray shielding layer can be used.

The thickness of the low-refractive-index layer may be usually 300 nm or less, preferably 200 nm or less, and more preferably 150 nm or less from a viewpoint of reduction of reflectance. Also, the thickness of the low-refractive-index layer may be usually 20 nm or more, preferably 40 nm or more, and more preferably 60 nm or more. In one embodiment, the thickness of the low-refractive-index layer may be usually 20 nm or more and 300 nm or less, preferably 20 nm or more and 200 nm or less, 20 nm or more and 150 nm or less, 40 nm or more and 300 nm or less, 40 nm or more and 200 nm or less, 40 nm or more and 150 nm or less, 60 nm or more and 300 nm or less, 60 nm or more and 200 nm or less, or 60 nm or more and 150 nm or less.

FIG. 1 is a cross-sectional conceptual diagram which illustrates an example of the laminated film according to an embodiment. In a multilayer resin film in which a first poly(meth)acrylimide-based resin layer (α1) 3, an aromatic polycarbonate-based resin layer (β) 4, and a second poly(meth)acrylimide-based resin layer (α2) 5 are directly laminated in this order in this example, a heat-ray shielding layer 2 is directly formed on the surface on the side of the layer (α1) 3, and furthermore a low-refractive-index layer 1 is directly formed thereon.

The visible-light transmittance of the laminated film according to an embodiment may be preferably 75% or more, more preferably 80% or more, further preferably 88% or more, and most preferably 90% or more. A higher visible-light transmittance is more preferred. Here, the visible-light transmittance is a value measured in accordance with 6.4 Visible-light transmittance test in JIS A 5759:2008 using a spectrophotometer "SolidSpec-3700" (trade name) of Shimadzu Corporation.

The total light transmittance of the laminated film according to an embodiment (measured in accordance with JIS K 7361-1:1997 using a turbidimeter "NDH2000" (trade name) of Nippon Denshoku Industries Co., Ltd.) may be preferably 75% or more, more preferably 80% or more, further preferably 88% or more, and most preferably 90% or more. A higher total light transmittance is more preferred.

The shielding factor of the laminated film according to an embodiment may be preferably 0.95 or less, more preferably 0.94 or less, further preferably 0.93 or less, and further more preferably 0.90 or less. A lower shielding factor is more preferred. Herein, the shielding factor is measured and calculated in accordance with the "a" method of 6.5 Shielding factor test in JIS A 5759:2008. The solar transmittance and solar reflectance are each measured using a spectrophotometer "SolidSpec-3700" (trade name) of Shimadzu Corporation.

The minimum reflectance of the laminated film according to an embodiment may be usually 1.5% or less, preferably 1% or less, more preferably 0.8% or less, further preferably 0.6% or less, and most preferably 0.5% or less. A lower minimum reflectance is more preferred. Herein, the minimum reflectance is measured in the following manner: a black adhesive sheet is pasted on the surface opposite to the low-refractive-index layer side of a laminated film to obtain a test piece; a reflectance spectrum of visible light (wavelength 380 to 780 nm) for the test piece is measured under conditions where a spectrophotometer "SolidSpec-3700" (trade name) and a reflection unit "Absolute reflectance measurement, Angle of incidence 5°" (trade name) of Shimadzu Corporation are used and the regular reflection is set to 5 degrees (the reflection unit is placed in front of an integrating sphere) in accordance with the instruction of the spectrophotometer; the reflectance spectrum is then subjected to a smoothing treatment by a polynomial approximation method so as to obtain a treated spectrum; and the lowest reflectance is observed from the treated spectrum and the observed lowest value is defined as the minimum reflectance. The black adhesive sheet is obtained by mixing 20 parts by mass of a black acrylic-based adhesive master batch "Black-OT-1338" (trade name) of Resino Color Industry Co., Ltd. and 100 parts by mass of an adhesive "LKU-01" (trade name) of Fujikura Kasei Co., Ltd. so as to obtain a mixture, and applying the mixture to one surface of a biaxially stretched polyethylene terephthalate-based resin film "E5431" (trade name) of Toyobo Co., Ltd. with a thickness of 25 μm using an applicator so that the thickness after drying can be 35 μm. The L* value of the black adhesive sheet determined by measuring color from the surface of the adhesive layer is 3.13. The L* value is measured by measuring the XYZ coordinate in accordance with JIS Z 8722:2009 using a spectrocolorimeter "CM600d" of Konica Minolta Japan, Inc. with illumination of standard light D65 under the geometric condition "c" and under the condition where a component with specular reflection is included, and converting the resultant into the L*a*b* coordinate.

EXAMPLES

Various embodiments will now be described by way of Examples. It should be noted, however, that the various embodiments are not limited thereto.

Measurement Methods (i) Visible-Light Transmittance

The visible-light transmittance was measured in accordance with 6.4 Visible-light transmittance test in JIS A 5759:2008 using a spectrophotometer "SolidSpec-3700" (trade name) of Shimadzu Corporation.

(ii) Total Light Transmittance

The total light transmittance was measured in accordance with JIS K 7361-1:1997 using a turbidimeter "NDH2000" (trade name) of Nippon Denshoku Industries Co., Ltd.

(iii) Shielding Factor

The shielding factor was measured and calculated in accordance with the "a" method of 6.5 Shielding factor test in JIS A 5759:2008. The solar transmittance and solar reflectance were measured using a spectrophotometer "SolidSpec-3700" (trade name) of Shimadzu Corporation.

(iv) Minimum Reflectance

A black adhesive sheet was pasted on the surface opposite to the low-refractive-index layer side of a laminated film to obtain a test piece; a reflectance spectrum of visible light (wavelength 380 to 780 nm) for the test piece was measured under conditions where a spectrophotometer "SolidSpec-3700" (trade name) and a reflection unit "Absolute reflectance measurement, Angle of incidence 5°" (trade name) of Shimadzu Corporation were used and the regular reflection was set to 5 degrees (the reflection unit was placed in front of an integrating sphere) in accordance with the instruction of the spectrophotometer; the reflectance spectrum was then subjected to a smoothing treatment by a polynomial approximation method so as to obtain a treated spectrum; and from the treated spectrum, the lowest reflectance was observed as the minimum reflectance. The black adhesive sheet was obtained by mixing 20 parts by mass of a black acrylic-based adhesive master batch "Black-OT-1338" (trade name) of Resino Color Industry Co., Ltd. and 100 parts by mass of an adhesive "LKU-01" (trade name) of Fujikura Kasei Co., Ltd. so as to obtain a mixture, and applying the mixture to one surface of a biaxially stretched polyethylene terephthalate-based resin film "E5431" (trade name) of Toyobo Co., Ltd. with a thickness of 25 μm using an applicator so that the thickness after drying could be 35 μm. The L* value of the black adhesive sheet determined by measuring color from the surface of the adhesive layer was 3.13. The L* value was measured by measuring the XYZ coordinate in accordance with JIS Z 8722:2009 using a spectrocolorimeter "CM600d" of Konica Minolta Japan, Inc. with illumination of standard light D65 under the geometric condition "c" and under the condition where a component with specular reflection was included, and converting the resultant into the L*a*b* coordinate.

(v) Reflection Color Irregularities

Reflection was visually observed by irradiating the surface on the side of the low-refractive-index layer of a laminated film with fluorescent light while variously changing angles of incidence, and evaluated by the following criteria. It is noted that when making evaluation by the following criteria, in samples evaluated as being good, a difference in reflectance between the top of the waveform around a wavelength with the lowest reflectance and the bottom of the waveform adjacent thereto in a reflectance spectrum before smoothing treatment obtained in the measurement of the test (iv) for minimum reflectance was 1.0% or less; in samples evaluated as being moderate, the difference in reflectance was above 1.0% and 1.5% or less, and in samples evaluated as being poor, the difference in reflectance was above 1.5%.

Figure 3:
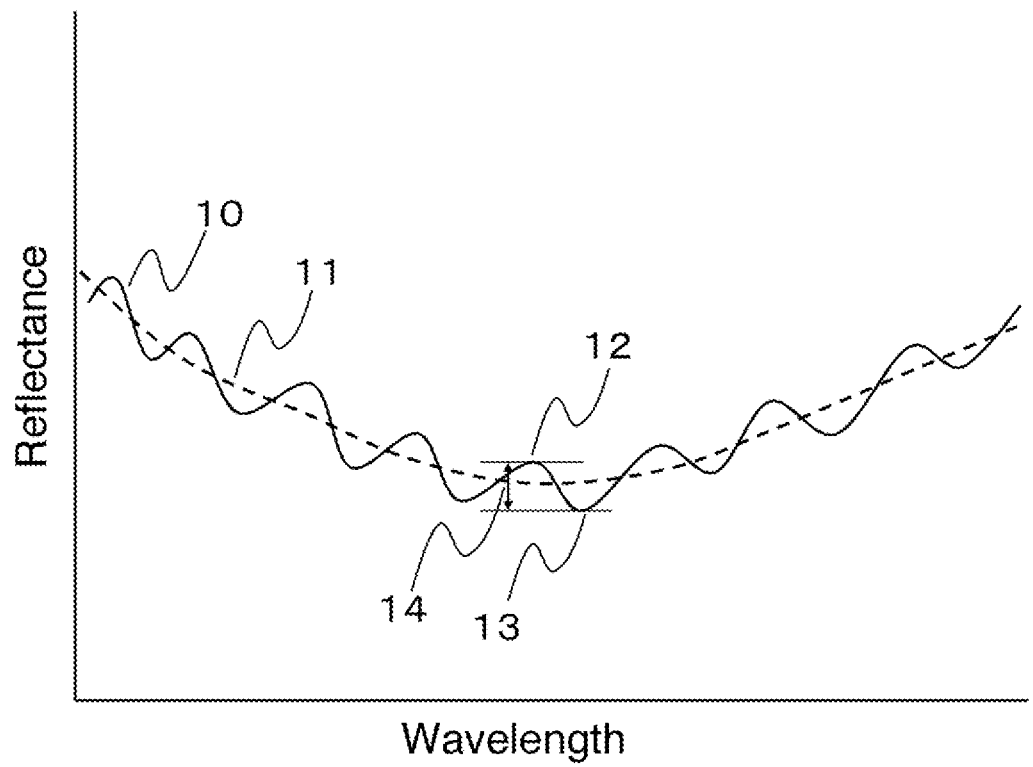
FIG. 3 is a conceptual diagram which illustrates a difference in reflectance between the top of the waveform around a wavelength with the lowest reflectance and the bottom of the waveform adjacent thereto in a reflectance spectrum before smoothing treatment.

In this regard, a conceptual diagram which illustrates a difference in reflectance between the top of the waveform around a wavelength with the lowest reflectance and the bottom of the waveform adjacent thereto in a reflectance spectrum before smoothing treatment is shown in FIG. 3.

○ (Good): Reflection color irregularities are not observed.

Δ (Moderate): Reflection color irregularities are slightly observed.

× (Poor): Reflection color irregularities are clearly observed.

Figure 2:
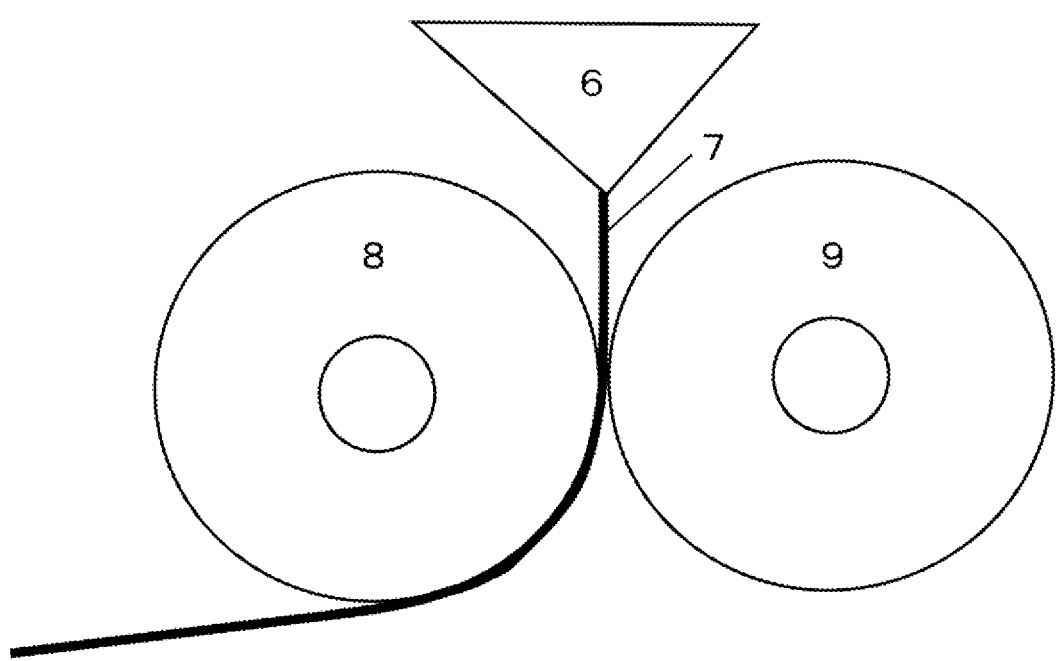
FIG. 2 is a conceptual diagram of a film-forming device used in Examples.

Raw Materials Used (α) Resin Film (α-1) Using an apparatus (see FIG. 2) including a two-component/three-layer multimanifold-type coextrusion T-die 6 and a winder having a mechanism to pressurize a melted film 7 with a first mirror-finished roll 8 (i.e. a roll to hold a melted film and send the melted film to a subsequent transfer roll) and a second mirror-finished roll 9, a two-component/three-layer multilayer resin film in which both outer layers (α1 layer and α2 layer) were formed of a poly(meth)acrylimide "PLEXIMID TT50" (trade name) available from Evonik Industry AG and an intermediate layer (β layer) was formed of an aromatic polycarbonate "CALIBRE 301-4" (trade name) available from Sumika Styron Polycarbonate Limited was continuously coextruded from the coextrusion T-die 6. The coextruded product was supplied and introduced between the rotating first mirror-finished roll 8 and the rotating second mirror-finished roll 9 so that the α1 layer was on the first mirror-finished roll side, and pressurized to obtain a transparent resin film having a total thickness of 250 μm, a thickness of the α1 layer of 80 μm, a thickness of the β layer of 90 μm, and a thickness of the α2 layer of 80 μm. Regarding the conditions set for this operation, the temperature of the T-die, the temperature of the first mirror-finished roll, the temperature of the second mirror-finished roll and the wind-up speed were set to 300° C., 130° C., 120° C. and 6.5 m/min, respectively. The refractive index (Rf) was 1.530, the total light transmittance was 93%, and the yellowness index was 0.6.

(α-2) A transparent resin film was obtained in the same manner as for the (α-1) except that the resin used as both outer layers ((α1) layer and (α2) layer) was replaced with an acrylic-based resin containing, when the sum of constitutional units derived from all polymerizable monomers is assumed to be 100 mol %, a constitutional unit derived from methyl methacrylate in an amount of 76.8 mol % and a constitutional unit derived from vinylcyclohexane in an amount of 23.2 mol %, the set temperature of the first mirror-finished roll was changed to 120° C., and the set temperature of the second mirror-finished roll was changed to 110° C. The refractive index (Rf) was 1.494, the total light transmittance was 93%, and the yellowness index was 0.5.

(α-3) A biaxially stretched polyethylene terephthalate-based film "DIAFOIL" (trade name) of Mitsubishi Plastics, Inc. with a thickness of 250 μm was used. The refractive index (Rf) was 1.710, the total light transmittance was 92%, and the yellowness index was 0.3.

(β) Coating Material for Forming Heat-Ray Shielding Layer (β-1) A coating material was obtained by mixing and stirring 80 parts by mass of (A-1) described below, 20 parts by mass of (A-2) described below, 160 parts by mass of (B-1) described below, 2 parts by mass of (C-1) described below (0.2 parts by mass in terms of solid content), 3 parts by mass of (C-2) described below and 375 parts by mass of (C-3) described below. The amounts of components (parts by mass) are shown in Table 1. It is noted that the amounts in terms of solid content for (C-1) are shown in the table.

(β-2 to β-6, β-9) Each coating material was obtained in the same manner as for the (β-1) except that the amounts (parts by mass) of (B-1) were changed as shown in Table 1 or Table 2.

(β-7, β-8) Each coating material was obtained in the same manner as for the (β-1) except that a heat-ray shielding material shown in Table 2 was used in a predetermined amount in place of (B-1).

(A) Polyfunctional (Meth)Acrylate (A-1) Dipentaerythritol hexaacrylate: hexafunctional.

(A-2) A polyfunctional urethane acrylate "RA6800" (trade name) of Mitsui Chemical, Inc.: pentafunctional.

(B) Heat-Ray Shielding Material (B-1) Tin-doped indium oxide fine particles: average particle diameter 15 nm.

(B-2) Antimony-doped tin oxide fine particles: average particle diameter 20 nm.

(B-3) Cesium-doped tungsten oxide fine particles: average particle diameter 20 nm.

(C) Others (C-1) A silicone-acrylic copolymer-based leveling agent "DISPARLON NSH-8430HF" (trade name) of Kusumoto Chemicals, Ltd.: solid content 10 mass %.

(C-2) An acetophenone-based photopolymerization initiator 1-hydroxy-cyclohexyl-phenylketone) "IRGACURE 184" (trade name) of BASF (C-3) Methyl isobutyl ketone.

(γ) Coating Material for Forming Low-Refractive-Index Layer (γ-1) A coating material was obtained by mixing and stirring 100 parts by mass of hollow silica-containing thermosetting coating material "Z-824" (trade name) of Aica Kogyo Company, Limited, 28 parts by mass of 1-methoxy-2-propanol, and 28 parts by mass of methyl isobutyl ketone.

(γ-2) A coating material was obtained by mixing and stirring 100 parts by mass of hollow silica-containing thermosetting coating material with a low refractive index "X12-2510A" (trade name) of Shin-Etsu Chemical Co., Ltd., 28 parts by mass of 1-methoxy-2-propanol, and 28 parts by mass of methyl isobutyl ketone.

Example 1

Both sides of the (α-1) were subjected to a corona discharge treatment. The wetting index of both sides was 57 mN/m. Next, the (β-1) was applied onto the surface on the side of the (α1) layer of the (α-1) so that the thickness after curing was 1.2 μm using a small diameter gravure coater. After preliminary drying, a heat-ray shielding layer was formed by irradiation with ultraviolet rays using a high pressure mercury lamp under the condition that the integrated quantity of light be 300 mJ/cm². Next, the (γ-1) was applied onto the heat-ray shielding layer so that the thickness after curing was 100 nm using a small diameter gravure coater. After preliminary drying, a low-refractive-index layer was formed by curing at a temperature of 140° C. so as to obtain a laminated film. The tests (i) to (v) were carried out. The results are shown in Table 1. It is noted that an LR layer means a low-refractive-index layer. The same applies to Table 2.

Examples 2 to 6

A laminated film was formed and physical properties were measured and evaluated in the same manner as in Example 1 except that the amounts of the (B-1) mixed in coating materials for forming a heat-ray shielding layer were changed as shown in Table 1. The results are shown in Table 1.

Example 7

A laminated film was formed and physical properties were measured and evaluated in the same manner as in Example 1 except that a coating material (β-7) for forming a heat-ray shielding layer containing 100 parts by mass of the (B-2) was used as a raw material in place of 160 parts by mass of the (B-1), and the thickness of the heat-ray shielding layer was changed to 5 μm. The results are shown in Table 2.

Example 8

A laminated film was formed and physical properties were measured and evaluated in the same manner as in Example 1 except that a coating material (β-8) for forming a heat-ray shielding layer containing 100 parts by mass of the (B-3) was used as a raw material in place of 160 parts by mass of the (B-1), and the thickness of the heat-ray shielding layer was changed to 5 μm. The results are shown in Table 2.

Example 9

A laminated film was formed and physical properties were measured and evaluated in the same manner as in Example 1 except that the amount of the (B-1) was changed from 160 parts by mass to 100 parts by mass, and the thickness of the heat-ray shielding layer was changed to 5 μm. The results are shown in Table 2.

Example 10

A laminated film was formed and physical properties were measured and evaluated in the same manner as in Example 1 except that the thickness of the heat-ray shielding layer was changed to 0.5 μm. The results are shown in Table 2.

Example 11

A laminated film was formed and physical properties were measured and evaluated in the same manner as in Example 1 except that the (α-2) was used as a resin film in place of the (α-1). The results are shown in Table 2.

Example 12

A laminated film was formed and physical properties were measured and evaluated in the same manner as in Example 1 except that the (α-2) was used as a resin film in place of the (α-1) and the (β-2) was used as a coating material for forming a heat-ray shielding layer in place of the (β-1). The results are shown in Table 2.

Example 13

A laminated film was formed and physical properties were measured and evaluated in the same manner as in Example 1 except that the (γ-2) was used as a coating material for forming a low-refractive-index layer in place of the (γ-1). The results are shown in Table 2.

Example 14

A laminated film was formed and physical properties were measured and evaluated in the same manner as in Example 1 except that the (α-3) was used as a resin film in place of the (α-1). The results are shown in Table 2.

Example 15

A laminated film was formed and physical properties were measured and evaluated in the same manner as in Example 1 except that the (α-2) was used as a resin film in place of the (α-1), the (β-9) was used as a coating material for forming a heat-ray shielding layer in place of the (β-1), and the amount of the (B-1) in the coating material for forming a heat-ray shielding layer was changed as shown in Table 2. The results are shown in Table 2.

In addition, it is noted that the evaluation results of physical properties when the thicknesses of layers forming a laminated film are changed can be estimated by a computer simulation. Such a simulation software is commercially available, and examples thereof can include "Thin-FilmView" (trade name) of Nary Software, and "Essential Macleod" (trade name) of SIGMAKOKI CO., LTD., and the like.

TABLE 1

|  |  | Ex. 1 | Ex. 2 | Ex. 3 | Ex. 4 | Ex. 5 | Ex. 6 |
|---|---|---|---|---|---|---|---|
| Resin film | Type | α-1 | α-1 | α-1 | α-1 | α-1 | α-1 |
|  | Thickness μm | 250 | 250 | 250 | 250 | 250 | 250 |
|  | Rf | 1.530 | 1.530 | 1.530 | 1.530 | 1.530 | 1.530 |
|  | Total light transmittance % | 93 | 93 | 93 | 93 | 93 | 93 |
|  | Yellowness index | 0.6 | 0.6 | 0.6 | 0.6 | 0.6 | 0.6 |
| Heat-ray shielding layer | Type | β-1 | β-2 | β-3 | β-4 | β-5 | β-6 |
|  | Rh | 1.563 | 1.531 | 1.540 | 1.557 | 1.573 | 1.581 |
|  | Rh − Rf | 0.033 | 0.001 | 0.010 | 0.027 | 0.043 | 0.051 |
|  | Thickness μm | 1.2 | 1.2 | 1.2 | 1.2 | 1.2 | 1.2 |
|  | A-1 (Parts by mass) | 80 | 80 | 80 | 80 | 80 | 80 |
|  | A-2 (Parts by mass) | 20 | 20 | 20 | 20 | 20 | 20 |
|  | B-1 (Parts by mass) | 160 | 40 | 60 | 100 | 280 | 630 |
|  | C-1 (Parts by mass) | 0.2 | 0.2 | 0.2 | 0.2 | 0.2 | 0.2 |
|  | C-2 (Parts by mass) | 3 | 3 | 3 | 3 | 3 | 3 |
|  | C-3 (Parts by mass) | 375 | 375 | 375 | 375 | 375 | 375 |
| LR layer | Type | γ-1 | γ-1 | γ-1 | γ-1 | γ-1 | γ-1 |
|  | Thickness nm | 100 | 100 | 100 | 100 | 100 | 100 |
|  | RL | 1.380 | 1.380 | 1.380 | 1.380 | 1.380 | 1.380 |
|  | Rh − RL | 0.183 | 0.151 | 0.160 | 0.177 | 0.193 | 0.201 |
| Evaluation results | Visible-light transmittance % | 92.7 | 92.5 | 92.7 | 92.6 | 92.5 | 92.3 |
|  | Total light transmittance % | 92.6 | 93.0 | 93.0 | 93.3 | 92.8 | 92.8 |
|  | Shielding factor | 0.93 | 0.95 | 0.95 | 0.94 | 0.92 | 0.91 |
|  | Minimum reflectance % | 0.54 | 0.72 | 0.68 | 0.52 | 0.36 | 0.30 |
|  | Reflectance color irregularities | ○ | Δ | ○ | ○ | Δ | Δ |

TABLE 2

|  |  | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|---|
| Resin film | Type | α-1 | α-1 | α-1 | α-1 | α-2 | α-2 | α-1 | α-3 | α-2 |
|  | Thickness μm | 250 | 250 | 250 | 250 | 250 | 250 | 250 | 250 | 250 |
|  | Rf | 1.530 | 1.530 | 1.530 | 1.530 | 1.494 | 1.494 | 1.530 | 1.710 | 1.494 |
|  | Total light transmittance % | 93 | 93 | 93 | 93 | 93 | 93 | 93 | 92 | 93 |
|  | Yellowness index | 0.6 | 0.6 | 0.6 | 0.6 | 0.5 | 0.5 | 0.6 | 0.3 | 0.5 |
| Heat-ray shielding layer | Type | β-7 | β-8 | β-4 | β-1 | β-1 | β-2 | β-1 | β-1 | β-9 |
|  | Rh | 1.540 | 1.540 | 1.563 | 1.563 | 1.563 | 1.531 | 1.563 | 1.563 | 1.597 |
|  | Rh − Rf | 0.010 | 0.010 | 0.033 | 0.033 | 0.069 | 0.037 | 0.033 | −0.147 | 0.103 |
|  | Thickness μm | 5 | 5 | 5 | 0.5 | 1.2 | 1.2 | 1.2 | 1.2 | 1.2 |
|  | A-1 (Parts by mass) | 80 | 80 | 80 | 80 | 80 | 80 | 80 | 80 | 80 |
|  | A-2 (Parts by mass) | 20 | 20 | 20 | 20 | 20 | 20 | 20 | 20 | 20 |
|  | B-1 (Parts by mass) | — | — | 100 | 160 | 160 | 40 | 160 | 160 | 1000 |
|  | B-2 (Parts by mass) | 100 | — | — | — | — | — | — | — | — |
|  | B-3 (Parts by mass) | — | 100 | — | — | — | — | — | — | — |
|  | C-1 (Parts by mass) | 0.2 | 0.2 | 0.2 | 0.2 | 0.2 | 0.2 | 0.2 | 0.2 | 0.2 |
|  | C-2 (Parts by mass) | 3 | 3 | 3 | 3 | 3 | 3 | 3 | 3 | 3 |
|  | C-3 (Parts by mass) | 375 | 375 | 375 | 375 | 375 | 375 | 375 | 375 | 375 |
| LR layer | Type | γ-1 | γ-1 | γ-1 | γ-1 | γ-1 | γ-1 | γ-2 | γ-1 | γ-1 |
|  | Thickness nm | 100 | 100 | 100 | 100 | 100 | 100 | 100 | 100 | 100 |
|  | RL | 1.380 | 1.380 | 1.380 | 1.380 | 1.380 | 1.380 | 1.440 | 1.380 | 1.380 |
|  | Rh − RL | 0.160 | 0.160 | 0.183 | 0.183 | 0.183 | 0.151 | 0.123 | 0.183 | 0.217 |
| Evaluation results | Visible-light transmittance % | 79.4 | 76.6 | 90.1 | 93.8 | 91.2 | 91.5 | 91.3 | 91.6 | 91.9 |
|  | Total light transmittance % | 80.4 | 78.1 | 90.5 | 93.7 | 91.1 | 91.9 | 91.4 | 91.5 | 92.0 |
|  | Shielding factor | 0.82 | 0.69 | 0.91 | 0.94 | 0.93 | 0.93 | 0.94 | 0.93 | 0.90 |
|  | Minimum reflectance % | 0.71 | 0.72 | 1.48 | 0.30 | 0.66 | 0.70 | 1.80 | 0.58 | 0.66 |
|  | Reflectance color irregularities | ○ | ○ | Δ | ○ | Δ | ○ | ○ | X | X |

From these results, it was found that each laminated film according to an embodiment was excellent in antireflection function and infrared-shielding function, the transparency was high, and the reflection color irregularities were suppressed. Therefore, the laminated film according to an embodiment can be suitably used for e.g. a building window glass, a car roof window, and a car front window.

REFERENCE SIGNS LIST

1 Low-refractive-index layer
2 Heat-ray shielding layer
3 First poly(meth)acrylimide-based resin layer (α1)
4 Aromatic polycarbonate-based resin layer (β)
5 Second poly(meth)acrylimide-based resin layer (α2)
6 T die
7 Molten film
8 First mirror-finished roll
9 Second mirror-finished roll
10 Reflectance spectrum before smoothing treatment
11 Reflectance spectrum after smoothing treatment
12 Top of waveform around wavelength with lowest reflectance
13 Bottom of waveform adjacent to top of waveform
14 Difference in reflectance

The invention claimed is:

1. A laminated film comprising:
a heat-ray shielding layer and a low-refractive-index layer in this order on at least one surface of a resin film, wherein a difference (Rh−Rf) between a refractive index (Rh) of the heat-ray shielding layer and a refractive index (Rf) of the resin film is −0.1 to 0.1;
wherein a difference (Rh−RL) between the refractive index (Rh) of the heat-ray shielding layer and a refractive index (RL) of the low-refractive-index layer is 0.05 or more
wherein the refractive index (RL) of the low-refractive-index layer is 1.2 to 1.45; and
wherein the heat-ray shielding layer is formed from a coating material comprising:
(A) 100 parts by mass of a polyfunctional (meth)acrylate; and
(B) 40 parts by mass or more of a heat-ray shielding material.

2. The laminated film according to claim 1, wherein a thickness of the heat-ray shielding layer is 0.1 to 5 μm.

3. The laminated film according to claim 1 or 2, wherein a visible-light transmittance is 88% or more.

4. An article comprising the laminated film according to claim 1.

5. An article comprising the laminated film according to claim 2.

6. An article comprising the laminated film according to claim 3.

7. The laminated film according to claim 1, wherein the refractive index (Rf) of the resin film is 1.40 to 1.60.

8. The laminated film according to claim 1, wherein the refractive index (Rh) of the heat-ray shielding layer is 1.40 to 1.65.

9. The laminated film according to claim 1, wherein the (B) heat-ray shielding material has an average particle diameter of 1 to 300 nm.

10. The laminated film according to claim 1, wherein in a reflectance spectrum of visible light at a wavelength of 380 to 780 nm, a difference in reflectance between the top of a waveform around a wavelength with the lowest reflectance and the bottom of a waveform adjacent thereto is 1.0% or less, or above 1.0% and 1.5% or less.

11. A building window glass, a car roof window, or a car front window comprising the laminated film according to claim 1.

* * * * *